United States Patent Office 3,556,669
Patented Jan. 19, 1971

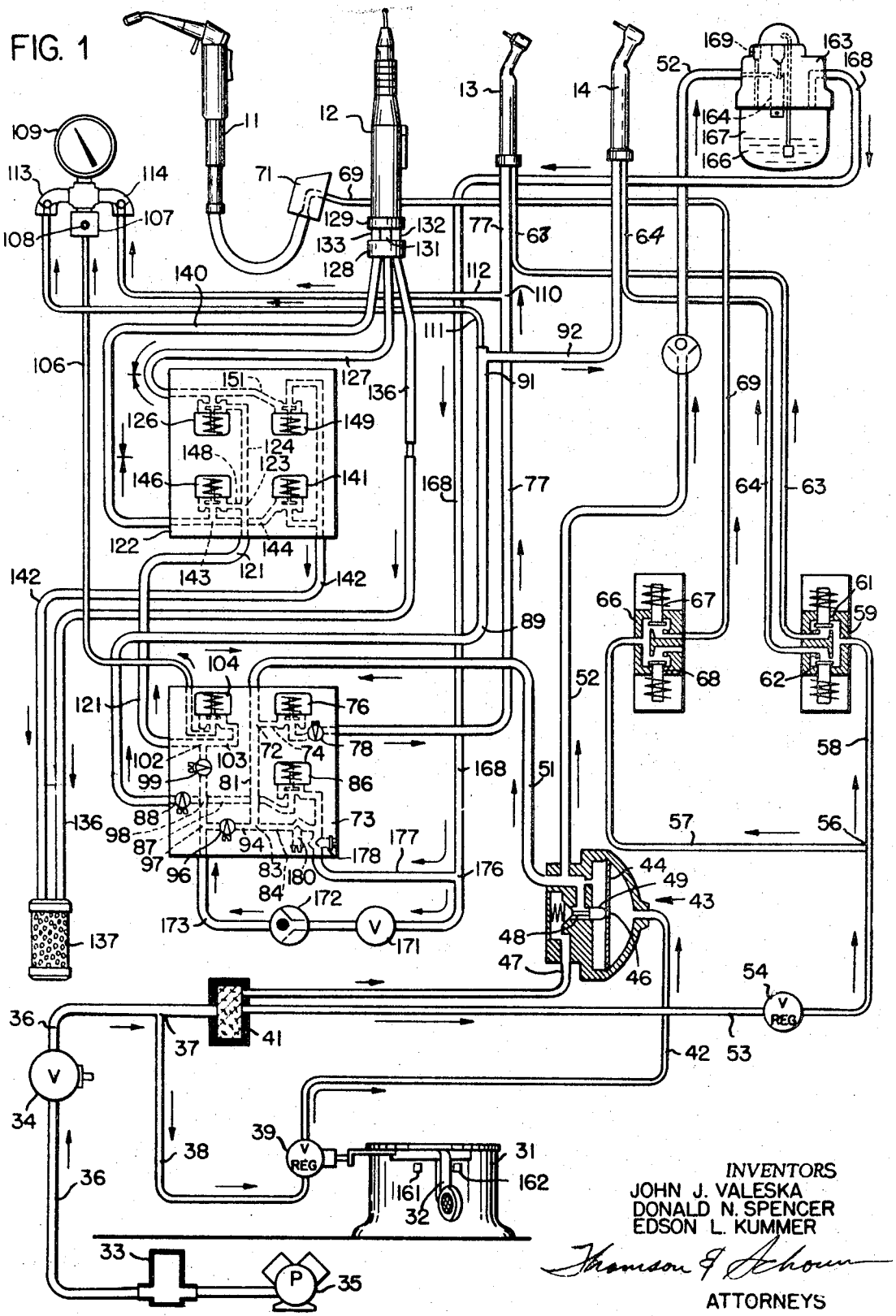

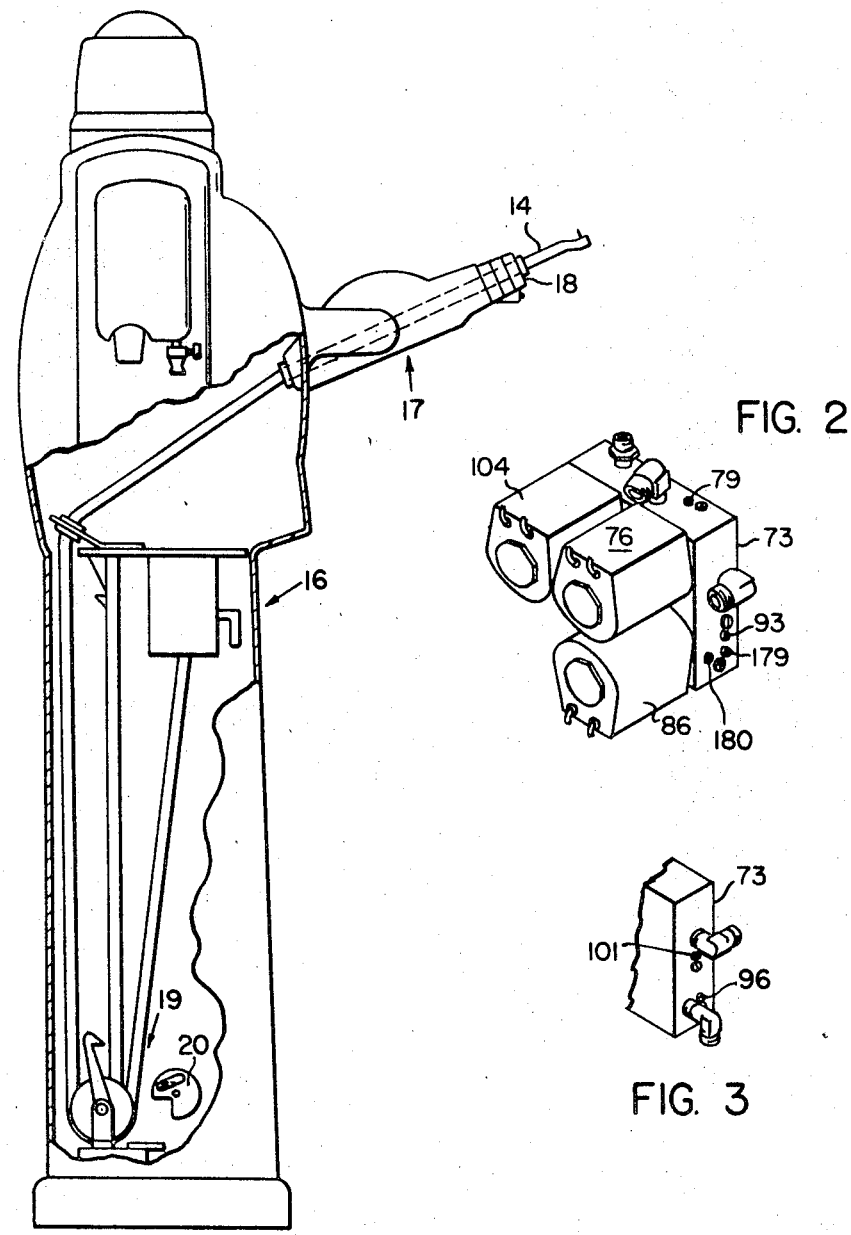

3,556,669
FLUID CONTROL SYSTEM FOR DENTAL INSTRUMENTS
John J. Valeska, Rochester, Donald N. Spencer, Pittsford, and Edson L. Kummer, Rochester, N.Y., assignors, by mesne assignments, to Sybron Corporation, a corporation of New York
Original application Feb. 1, 1965, Ser. No. 429,398. Divided and this application Feb. 10, 1969, Ser. No. 797,831
Int. Cl. F01d *15/06;* A61c *1/16;* F01k *23/16*
U.S. Cl. 415—61
15 Claims

ABSTRACT OF THE DISCLOSURE

A control system for a plurality of air driven dental tools including adjustable air pressure valve means for independently varying the air pressure supplied to each tool and also including adjustable oil control valve means for independently varying the quantity of oil supplied to each tool requiring oiled air whereby any tool can be replaced by a different tool having different air pressure and oil supply requirements by simply making suitable adjustments in the respective valve means.

CROSS-REFERENCES TO RELATED APPLICATIONS

This application is a divisional application of my co-pending application Ser. No. 429,398 filed Feb. 1, 1965, now U.S. Pat. No. 3,461,561 granted Aug. 19, 1969, same title as this application.

BACKGROUND OF THE INVENTION

Field of the invention

This invention relates to control systems for rotatable, air-driven dental tools and more particularly to a control system which is universal in application, being adjustable for supplying air alone or oiled air at any desired pressure and with any quantity of oil.

Description of the prior art

In recent years, so called high speed dental drills have come into common use. Such drills partially supplant the usual dental engine and belt driven drill employed in connection with and mounted on a dental unit. The speed of such high speed drills range up to 200–250 thousand r.p.m., the turbines thereof being usually driven by compressed air. More recently, some manufacturers have put out a so-called air bearing high speed handpiece which does not require lubrication and the usual ball bearings are eliminated.

The so called high speed dental drills of either type do not completely supplant the usual dental engine, since they are high speed and their characteristics are such that they generate only a limited amount of torque. When high torque at low speed is required, the dentist has heretofore used a dental engine and belt drive assembly. Still more recently, the air driven high torque low speed dental drill has come into use. Such drives completely replace the dental engine if the dentist so desires.

There are a large number of manufacturers of so called high speed dental drills. These in general require oil but some of them do not. There are a lesser number of manufacturers of so-called air bearing handpieces which do not require oil and, in fact must be run dry. So called high speed handpieces whether of the oiled bearing or air bearing type have different requirements as to air pressure. That is, in general, each handpiece has a most efficient operating speed and requires a specific air pressure to attain that efficiency. In general, they should not be used at all, except very inefficiently at a pressure below a specified minimum.

Several so called high torque low speed handpieces are on the market which require air at a different pressure and differing from the pressure requirements of either bearing or dry high speed handpieces. In addition, various manufacturers put on the market instruments which must be supplied with air, such as syringes; some dental mirrors employ air to blow debris off the mirror and evaporate the moisture from the reflecting surface thereof. Moreover, most manufacturers specify the number of drops of oil the handpieces of their manufacture require.

The assignee of this application is a manufacturer of dental units and also a manufacturer of several of the hand instruments disclosed in this application. However, dentists have preferences for hand instruments of different manufacturers—one dentist will like one make while another will like a different make. The assignee of this application has recently placed on the market a new dental unit having holders or supports for a number of different instruments. It employs the air and oil control system of this application which is substantially universal in its application so that the dentists may buy the dental unit of applicants' assignee, and then purchase and have installed for him the hand instruments of any manufacturer, the hand instruments of his preference.

SUMMARY OF THE INVENTION

The present invention provides a control system which is universal in its application, being adapted to supply to any one of a number of dental instruments air alone or oiled air, such air being supplied at any desired pressure, and with any desired quantity of oil suspended in the air. The present invention also provides a bleed of system upstream of solenoid valves in the air lines to the various instruments such that air trapped in the air lines upstream of such valves is removed or purged from the air lines.

BRIEF DESCRIPTION OF THE DRAWINGS

These and other objects and advantages of the present invention will be more fully understood by reference to the following detailed description when read in conjunction with the attached drawing, wherein like reference numerals refer to like elements and in which:

FIG. 1 is a schematic view of the air control system of our invention;

FIG. 2 is a view showing the solenoid block or manifold in perspective which is part of the diagrammatic showing in FIG. 1 and shows the solenoids and the adjustments for controlling the air;

FIG. 3 is a side elevation looking from the left of FIG. 2; and

FIG. 4 is a diagrammatic showing how the operation of the various instruments is initiated.

DESCRIPTION OF THE PREFERRED EMBODIMENTS

For the purpose of this application, the term "dry handpiece" will be used in connection with a dental instrument which does not require oil; and "oil handpiece" will be used in describing a handpiece which requires oil for its operation. The dental instruments, with which the control system of our invention is concerned, may comprise a multi-syringe 11 for supplying air, water, or a mixture of air and water to the teeth being operated upon; a high torque low speed handpiece 12 which may be operated either oiled or dry; a dry air handpiece 13 which may be of the air bearing type, and still another handpiece which may be an oil or dry handpiece depending upon the manufacturer thereof or the preference of the dentist.

As previously mentioned, the assignee of this application is a manufacturer of dental units. The major concept of this invention is to provide a control system of such versatility that the dental instruments of any manufacturer may be mounted in the dental unit and, by adjustment of the control system, supplied with dry or oiled air at any desired pressure by suitable adjustments of the control system.

The syringe 11 is of the multi-purpose type adapted to supply air, water or a mixture of air and water, a mist to the tooth being operated upon. The water connections have not been shown as they are not part of the control system with which this invention is concerned. The syringe and the manner in which both air ad water are controlled as to pressure and volume has been shown and described in U.S. Pat. No. 3,393,676 issued July 23, 1968 entitled "Dental Instrument Assembly." However, as will be apparent, types of syringes other than that shown in that patent may be employed or substituted.

The handpiece 12 is shown in U.S. Pat. 3,309,965 issued Mar. 21, 1967 entitled "Combined Fluid Motor and Speed Reducer for Driving Dental Tools." The particular handpiece shown in Pat. 3,309,965 is a high torque low speed handpiece designed to replace the conventional dental engine heretofore employed in the practice of dentistry. This handpiece requires a minute quantity of oil to be fed to it; and insofar as Applicants are aware, all handpieces of this type require oil in varying quantities. However, in the future some manufacturer may place on the market a dry high torque low speed handpiece or in some cases the dentist may prefer to use the conventional dental engine and employ a third high speed handpiece perhaps both a straight handpiece and a contra-angle handpiece.

The handpiece 13 illustrated in the drawing is of the so called air bearing type in which the rotor "floats" on air under pressure. Such air bearing handpieces have become quite popular recently since they eliminate bearing problems. However, they have other shortcomings and it is a matter of the individual preference of the dentist as to whether he uses an air bearing handpiece or not.

The handpiece indicated by the numeral 14, is of the so called bearing type and operates at from 100,000 to 250,000 r.p.m. At this speed, it is designed to drill teeth rapidly but is capable of developing only a limited amount of torque. It is therefore not suitable or desired by dentists for performing finishing operations on a tooth cavity just prior to applying filling material to the tooth. Such finishing operations are usually performed by a dental engine but may be performed by the handpiece 12 of Pat. 3,309,965.

A handpiece such as the handpiece 14 is shown in a number of issued patents wherein the rotor is air turbine driven and mounted in miniature ball bearings. These bearings require, because of their high speed, a relatively large volume of oil as compared to a low speed handpiece as illustrated at 12.

The handpieces or dental instruments are mounted in a dental unit diagrammatically illustrated in FIG. 4, the general type of which is shown in Bronk Reissue Pat. No. 24,087 issued Nov. 15, 1955. As shown in that patent and as illustrated in FIG. 2, the dental unit 16 has a carrier 17 having a plurality of sockets 18 for the reception of the hand instruments when they are not being used. When the entire unit is not in use, the holder or carrier 17 may be retracted into the unit and the opening left thereby closed by a cover.

Each of the instruments is connected to a hose which is retracted into the unit by a weighted pulley system, as diagrammatically illustrated at 19 in FIG. 4 or by a spring controlled pulley. Such devices are in common use and need not be more fully described. When a particular instrument is to be used, it is pulled outwardly from the dental unit and during the operation of extending the instrument, a mercury or other type of switch 20 is actuated to initiate the action of the handpiece through the windings of a controller diagrammatically illustrated at 31 (FIG. 1).

When the dentist has completed the use of the particular handpiece, he releases the handpiece from manual control and the retraction mechanism 19 retracts the instrument into the holder and the mercury switch 20 is automatically opened. It is sufficient to state for the purposes of this application that the air supplied to the system is controlled by a lever 32 which is actuated by the foot of the dentist to vary the pressure of air supplied to the system. Foot controllers of the general type required are old, one being shown in U.S. Pat. No. 3,209,457 issued Oct. 5, 1965.

The system includes a pump 35, an air storage tank of chamber 33, and a main air valve 34. The main air valve 34 is usually shut off by the dentist at night and opened in the morning when the dentist begins his work. The air is supplied to the main air valve through a line 36 which when open supplies air through line 36. The line 36 has a branch 37 fitting one line 38 extending to a foot controller regulator 39 and then extending to an air filter 41. Suitable filters for our purpose are well-known in the art to which this invention applies and need not be particularly described.

Air flowing through the foot control regulator 39 passes through a line 42 to a pilot pressure air regulator generally indicated by the numeral 43. The pilot air pressure regulator 43 includes a diaphragm 44 defining a chamber into which air through the line 42 flows. The diaphragm has a relatively small aperture 46, the purpose of which will later appear.

Air flowing through the air filter flows through a line 47 to a valve 48 which has a stem 49 which exerts pressure on the other side of the diaphragm. The stem 49 covers the opening 46 when the system is under pressure. By shifting the foot controller 39 the pressure of air flowing to the righthand side of the diaphragm 44 may be controlled so as to increase or decrease the pressure on the spring controlled valve 48 to supply air to lines 51 and 52 at a predetermined desired pressure. It is the usual practice of a dentist to shift the lever in starting slowly so as to feed the air to the system and somewhat gradually increase the speed of the handpiece until it finally reaches the desired speed level.

A conduit 53 leads from the air filter 41 and flows to an air pressure regulator 54. The air pressure regulator 54 controls the pressure of coolant air supplied to the handpieces 12, 13 or 14 and also supplies air to the syringe 11 as described in the above mentioned Pat. 3,393,676. The air is also used to break up into a spray water supplied by the syringe as a coolant to a tooth being drilled. From the air pressure regulator 54, air flows to a branch 56 having legs 57 and 58.

The air flowing through leg 58 flows to a solenoid assembly 59 which has a solenoid valve 61 and solenoid valve 62. The switches for actuating these solenoids may be the same switches which actuate the solenoids to be described for supplying driving air to the handpieces 13 and 14. From the solenoids 61 and 62 the coolant air passes by means of conduits 63 and 64 respectively to the handpieces 13 and 14. The manner in which coolant air is supplied to the teeth being operated upon is well-known.

Branch 57 connects to a solenoid 66 which has solenoid valves 67 and 68. When opened, solenoid valve 67 permits flow of air through conduit 69 through a multi-syringe connection body 71 and from thence to the syringe 11. The syringe may be one of a number of types now on the market and may be similar to that shown in Pat. No. 3,393,676. The high torque relatively low speed handpiece 12 requires no coolant air so that solenoid 68 is not connected to the handpiece 12. The solenoid 68 is a spare outlet for air should another instrument requiring an additional air supply for example, an instrument requiring coolant air, be used.

Air flowing through the conduit 51 from the pressure regulator 43 flows to a branch 72. Branch 72 includes a conduit 74 controlled by a solenoid valve 76 mounted on solenoid manifold 73 shown more clearly in FIGS. 2 and 3. When the handpiece 13 is pulled out of its socket, the mercury switch 20 (FIG. 4) associated with it is actuated to actuate solenoid 76 and permit dry air to flow through the conduit 77 to drive the handpiece 13. Simultaneously the solenoid valve 61 is actuated to supply coolant air.

It will be appreciated that the handpiece 13 may be of a type differing in its operating characteristics and requiring air, at a lower pressure than normally would flow through the line 77 or as controlled by pressure regulator 43. In its fully open setting, pressure regulator 43 delivers substantially higher pressure than normally required in the system, substantially, the air pressure of which the compressor 32 is capable.

For the purpose of regulating the pressure of air flowing to the handpiece 13, a valve 78 is located in the line 77 to enable the pressure in the line 77 to be cut down to meet the requirements of the particular make of handpiece 13 employed. Once the valve 78 has been set for a particular handpiece 13, it will be left in this adjusted position. However, if another make of handpiece is substituted for the handpiece 13, then the valve 78 must be readjusted to meet the requirements of the substitute handpiece. The adjustment screw for valve 78 has been shown at 79 in FIG. 2.

A line 81 leads from the branch 72 and flows to a branch 83. A line 84 which extends to a solenoid valve 86, the opening and closing of which is controlled by a mercury switch associated with the handpiece 14 is illustrated in FIG. 4. From the solenoid valve 86 the air flows through a conduit 87 and through a valve 88 through a conduit 89 and from thence to a branch 91. One leg 92 of the branch supplies pressure air for the handpiece 14 upon actuation of its corresponding mercury switch, when the handpiece 14 is withdrawn from its socket. The valve 88 in the line 87–89 controls the pressure of air flowing to the handpiece 14 in the same manner that the valve 78 controls the pressure air flowing to the handpiece 13. The screw adjustment for the valve 88 is shown at 93 in FIG. 2.

A conduit 94 extends from the branch 83 and has a valve 96 located therein, the purpose of which will be later described. The conduit 94 connects to a branch fitting 97, one leg of which, 98, has a valve 99 located therein. Adjustment of the valve 99, which valve is similar to the valves 78 and 96, the screw adjustment of which is shown in FIG. 3 at 101, extends to a branch 102. One leg 103 of the branch passes through a solenoid valve 104. A conduit 106 extends from the solenoid 104 to a fitting 107. The fitting 107 has a residual pressure bleeder hole 108, the purpose of which will later appear.

The fitting is connected to a gauge 109 which registers the operating pressure at which any one of the handpieces is being operated. For this purpose, conduits 111 and 112 are connected respectively to the conduits 89 (at 91) and 77 (at 110). The conduits 111 and 112 are connected respectively to elbow fittings 113 and 114 which have check valves located therein. The check valves prevent backflow through the lines 111 and 112. The air gauge may be said to "float" on the various lines, and during the operation will register the pressure of air flowing to the handpieces 12, 13 and 14.

A line 121 extends from the branch 102 to a solenoid manifold block 122 which has been only diagrammatically illustrated. Conduit 121 connects at a branch 123 to a conduit 124 which connects with a solenoid valve 126. The solenoid valve 126 connects to a line 127 which is connected into a fitting 128. Three lines extend therefrom to a chamber 129 located at the end of the handpiece 12. Line 131 which connects between the fitting 128 and the chamber 129 connects to the line 127 and is the forward drive line of the low speed torque handpiece 12. The arrangement of the parts in the handpiece 12 is shown in Pat. 3,309,965. As described in that patent, the hand-piece 12 must be reversible. Frequently the dentist at low speed is finish-drilling the tooth preparatory to filling it, and in smoothing out the cavity it is sometimes desirable to reverse the direction of rotation of the drill.

The air passing through the line 131 to the chamber 129 and driving the handpiece 12 is exhausted through lines 132 and 133. An examination of Pat. 3,309,965 will show why two discharge air lines are required. When the handpiece is in operation a certain volume of air is flowing to the handpiece in a forward direction through the line 131. This air is expanded, and consequently more discharge air capacity is required than intake capacity. Moreover, the design of the drive which is of the turbine type is such that air must exhaust from the chamber 129 within approximately 180 degrees from its entrance and also from approximately 300 degrees from its entrance.

Lines 131 and 133 are both pressure and exhaust lines depending upon the direction of rotation of the rotor. The exhaust line 132 which is common to the pressure lines 131 and 133 extends to a line 136 and flows to an exhaust muffler 137 of any suitable type. When the forward solenoid valve 126 is actuated to provide driving air through the pressure line 131, a solenoid valve 141 is actuated to connect a line 142 extending to the exhaust manifold 137 through the line 133 by means of a line 140 and a branch fitting 143 from which line 144 extends to solenoid valve 141.

When the direction of rotation of handpiece 12 is to be reversed, a reverse pressure solenoid valve 146 is actuated to cause pressure air to flow from the line 121 through the fitting 123 through the branch line 148 through the solenoid valve. From the solenoid valve 146 air flows through the branch fitting 143 through line 140, through line 133, and from thence to the low speed high torque handpiece 12. Simultaneously with the operation of the reverse pressure solenoid valve 146, the reverse exhaust solenoid valve 149 is actuated which connects the exhaust muffler 137 to the chamber 129 in the handpiece through lines 131, 127 and 151 to the reverse exhaust line 142. Reference is hereby made to our copending application Ser. No. 429,398, filed Feb. 1, 1965 directed to a control system for reversing the direction of rotation of a handpiece.

When the dentist removes one of the handpieces 12, 13 or 14 from its socket in the dental unit, he desires that its rotation be minimal. As he then applies the drill to the tooth, he increases its speed by actuating the footpiece 32 of the foot controller 31. When he discontinues the use of, for example, the handpiece 14, air under pressure of perhaps 45–50 pounds per square inch is trapped in the line. Thus, if he again uses the handpiece 14 within, let us say, the next few minutes after its first use, this trapped air will not have leaked out of the system, and immediately upon actuating the corresponding mercury switch 20, the turbine in the handpiece 14 will rotate at high speed.

To avoid the above described action, a residual pressure bleeder opening 108 and the opening 46 in the diaphragm 44 are for the purpose of bleeding the air under pressure out of the line when use of any one of the handpieces is discontinued. These bleeder openings while they are relatively small, are sufficient to bleed the lines within a short time after the dentist discontinues use of a particular handpiece. Air under pressure in the line 77 bleeds through the conduit 112 to the opening 108, and air bleeds also backward from the then closed solenoid valve 76 through the connections to the line 51 and through the opening 46 in the diaphragm. Likewise, pressure in line 92 bleeds through the line 111 to the minute outlet 108 and backward through the lines from the then closed solenoid valve 86 to the opening 46 in the diaphragm 44. As previously mentioned, the air gauge solenoid valve is open when either the forward pressure solenoid valve 126 is open or the reverse pressure solenoid valve 146 is open. When these valves are closed the air gauge solenoid valve is closed and the air gauge is cut off. Howeer, the pressure air bleeds backward through lines 103, 98, 94, 81, and 51 to the bleed opening 46 in the diaphragm 44.

When either the handpiece 13 or 14 is to be used, it is withdrawn from a socket and the corresponding mercury switch 20 is actuated to actuate the corresponding solenoid. This may be a simple direct circuit. However, the low speed high torque handpiece 12 must be reversible. The foot controller should therefore be rotatable either clockwise or counterclockwise from a neutral air shut-off position. We will assume that the foot actuated arm 32 is in a neutral position as shown in FIG. 1. Switches 161 and 162 diagrammatically illustrated are located in the foot controller 31. When the lever 32 is rotated clockwise or to the left, as viewed in FIG. 1, it actuates a switch 161 in circuit with the forward pressure solenoid valve 126; the forward exhaust solenoid 141 and the air gauge solenoid valve 104. This gives a reading of the pressure of air supplied to the handpiece 12 and furnishes driving air for this handpiece and opens the exhaust muffler 137 to the chamber 129 in the handpiece.

The handpieces 12 and 14 may be supplied with either oiled or dry air while the handpiece 13 can only, under the set-up shown, be supplied with dry air. Of course the syringe 11 does not require oil. It is contemplated that the handpiece 13 will be of the air bearing type, or if the dentist decides not to use an air bearing handpiece, the socket in the dental unit may be employed to support, for example, a cautery or a mouth lamp, neither of which requires oil.

The handpieces of various manufacturers of ball bearing handpieces require varying amounts of oil, or let us say that at least the manufacturers thereof recommend varying amounts of oil to be supplied to their handpieces. In general, the range is from 15 to 20 drops per minute. The high torque low speed handpiece 12, however, requires considerably less oil, in the area of 2 to 3 drops of oil per minute. Usually the manufacturers specify the minimum amount of oil at which their handpiece will operate satisfactorily for the reason that while the oil used is usually a vegetable oil, some of it passes into the mouth of the patient.

The line 52 extends to a lubricator 163 of any suitable type. Such lubricators are old in the art and need not be specifically described. In general, air supplied to the lubricator at 164 picks up oil from a sump 166, the space 167 being filled with an oil bearing vapor which is supplied under pressure to a line 168. The lubricator has an adjustment screw 169 which adjusts the amount of oil supplied to handpiece 14 in accordance with the recommendations of the manufacturer thereof. This quantity of oil is cut down in the system as will presently be described to supply a lesser quantity of oil to the handpiece 12.

The line 168 from the lubricator includes a shut-off valve 171 and a check valve 172. Check valve 172 prevents oiled air from flowing in a reverse direction back to the lubricator, while the valve 171 can be shut off so that the handpietce 12 or the handpiece used as a substitute for the handpiece 12, can be operated dry if desired. Assuming the valve 171 is open, oiled air flows through the line 173, through the air pressure valve 99 which as previously described, controls the pressure of air supplied to the handpiece 12 and from thence through the lines 103 and 121.

The line 103 supplies oiled air to the air gauge while the line 121 supplies oiled air to the handpiece 12. The functioning of the various solenoid valves mounted on the upper manifold 122 is precisely the same as previously described when dry air is being supplied to the handpiece 12.

In the line 168 from the lubricator is a branch 176 which connects with a line 177 through the handpiece solenoid valve 86. This valve, as previously described, supplies pressure air to the handpiece 14. In the line 177 is a shut-off valve 178, the shut-off screw of which is shown at 179 in FIG. 2. When the valve 178 is closed and a valve 180 is open, air alone is supplied to the handpiece 14. When oil is to be supplied to the handpiece 14, valve 178 is opened by adjusting the screw 179 and the valve 180 is closed.

The upper portion of the lubricator is transparent and constitutes a sight dome. Thus the number of drops of oil per minute dropping into the sump can be counted. After the oil quantity for handpiece 14 is set, the lubricator requires no further adjustment to lower the drip rate to provide two or three drops per minute for the handpiece 12. This is done by the oil control valve 96. Valve 171 is normally closed when dry air is to be supplied to the handpiece 12. However, when oiled air is to be supplied to handpiece 12, valve 96 is moved toward an open position. This action lowers the pressure in line 51 and likewise the pressure in line 52. The pick up of oil from the sump operates on a venturi principle and the lesser pressure in the line 52 will result in less pick up oil from the sump 166. By adjusting the valve 96 the proper amount of oil flows to handpiece 12. Once set, unless the handpieces 12 or 14 are changed, the correct amount of oil will be supplied to both handpieces.

What is claimed is:

1. In a control system for a plurality of rotatable air driven dental tools adapted to be hand manipulated by a dentist, including a source of air under pretssure, a plurality of air driven tools, conduits connecting said source of air to said tools, and an air pressure regulator means in said conduits between said source of air and said tools for varying the pressure of air supplied to a tool when in use to vary the speed of rotation thereof, the improvement comprising:
   control means positioned in said conduits between said regulator means and said tools, said control means including a plurality of adjustable air pressure controlling valve means, each of said valve means being associated with a respective one of said tools for independently controlling the pressure of air supplied thereto, whereby a particular tool can be replaced with a different tool having a different air pressure requirement by adjusting the respective valve means.

2. The apparatus according to claim 1, including on-off valve means in each of said conduits to said tools for opening and closing the conduit to each respective tool independently of the other tools, and means in said conduits, downstream from said on-off valve means for purging said conduits of residual pressurized air after use of a tool has been discontinued.

3. The apparatus according to claim 2 wherein said con-off valve means comprises solenoid actuated valve means and including a plurality of manually actuated switch means, each of which is associated with a particular solenoid actuated valve and with a particular tool and each of which is actuated when its respective tool is withdrawn for use from a position of storage, for opening and closing the solenoid actuated valve in the conduit to said respective tool.

4. The apparatus according to claim 1 wherein at least two of said tools require oiled air for lubrication and including:
   an oil lubricator,
   an oil supply conduit for supplying oiled air having a predetermined quantity of oil therein, connecting said oil lubricator to said control means,
   interconnecting conduit means in said control means for connecting said oil supply conduit to said conduits connecting said source of air to said tools, and
   a plurality of adjustable oil control valve means in said control means, each of said oil control valve means being associated with a respective one of said tools requiring oiled air, for controlling the supply of oil thereto, whereby each of said tools requiring oiled air can be replaced with a different tool having a different tool having a different oil supply requirement by adjusting the respective oil control valve means.

5. The apparatus according to claim 4 including means in said conduits, downstream from said control means, for purging said conduits of residual pressurized air after use of a tool has been discontinued.

6. The apparatus according to claim 4 wherein said oil lubricator is connected to said air pressure regulator means and is of the type operating on the venturi principle, and wherein the oil control valve means is connected to means for reducing the air pressure in the oil lubricator air line from the regulator means whereby less oil is picked up from the oil lubricator.

7. A control system for a plurality of rotatable air driven dental tools adapted to be hand manipulated by a dentist comprising:
 (a) a source of air under pressure,
 (b) a plurality of air driven tools,
 (c) conduits connecting said source of air to said tools,
 (d) air pressure regulating means in said conduits between said source of air and said tools for varying the pressure of air supplied to a tool when in use to vary the speed of rotation thereof, and
 (e) a plurality of adjustable valve means in said conduits between said air pressure regulating means and said tools, each of said valve means being associated with a respective one of said tools for independently controlling the pressure of air supplied to each of said tools whereby a particular tool can be replaced with a different tool having a different air pressure requirement by adjusting said adjustable valve means.

8. The apparatus according to claim 7 including means in said conduits downstream from said adjustable air pressure regulating means for purging the conduits of residual pressurized air after use of a tool has been discontinued.

9. The apparatus according to claim 7 including means for supplying oiled air to each of two tools, said oiled air supplying means comprising:
 a single oil lubricator operating on the venturi principle and an air line connecting said oil lubricator to said air source,
 oil supply conduit means connecting each of said two tools to said oil lubricator for carrying oiled air to said tools, and
 adjustable control means connected to each of said oil supply conduit means for independently controlling the air pressure in said air line for controlling the amount of oil picked up in the respective oil supply conduit means from said oil lubricator.

10. In a control system for a plurality of rotatable air-driven dental tools adapted to be hand manipulated by a dentist, including a source of air under pressure, a plurality of air-driven dental tools, at least two of said tools requiring oiled air for lubrication, conduits connecting said source of air to said tools, and an air pressure regulator means in said conduits between said source of air and said tools for varying the pressure of air supplied to a tool when in use to vary the speed of rotation thereof, the improvement comprising:
 (a) means for supplying oiled air to each of said at least two tools, said means comprising:
  (1) an oil lubricator,
  (2) an air line connecting said oil lubricator to said source of air,
  (3) oil supply conduit means connecting each of said at least said two tools to said oil lubricator for carrying oiled air to said tools, and
  (4) adjustable control means connected to each of said oil supply conduit means for independently controlling the amount of oil supplied to each of said oil supply conduit means from said oil lubricator, whereby said tools requiring oiled air can be replaced by a different tool requiring a different amount of oil by adjusting said control means.

11. The apparatus according to claim 10 wherein said oil lubricator is a single oil lubricator of the type operating on the venturi principle and wherein each of said control means includes means for controlling the air pressure in said air line for controlling the amount of oil picked up in the respective oil supply conduit means.

12. The apparatus according to claim 10 including means in said conduits downstream from said adjustable air pressure control means for purging the conduits of residual pressurized air after use of a tool has been discontinued.

13. The apparatus according to claim 10 including a plurality of adjustable air pressure controlling valve means in said conduits, downstream from said air pressure regulating means, each of said air pressure controlling valve means being associated with a particular tool for independently controlling the pressure of air supplied thereto, whereby a particular tool can be replaced by a different tool having a different air pressure requirement by adjusting the respective air pressure controlling valve means.

14. In a control system for a plurality of rotatable air-driven dental tools adapted to be hand manipulated by a dentist, including a source of air under pressure, a plurality of air-driven dental tools, conduits connecting said source of air to said tools, and an air pressure regulator means in said conduits between said source of air and said tools for varying the pressure of air supplied to a tool when in use to vary the speed of rotation thereof, and on-off valve means in each of said conduits to said tools downstream from said air pressure regulator means, for opening and closing the conduit to each of said tools independently of the conduits to the other tools, said on-off valves being actuated when a particular tool is withdrawn for use from a position of storage, the improvement comprising:
 means in said conduits, downstream from said on-off valve means and from said air pressure regulator means, for purging said conduits of residual pressurized air after use of a tool has been discontinued.

15. The apparatus according to claim 14 wherein each of said on-off valve means comprises a solenoid actuated valve and including a plurality of switches for opening and closing said solenoid actuated valves, each of said switches being associated with a particular tool and being actuated when the respective tool is withdrawn for use from a position of storage.

References Cited

UNITED STATES PATENTS

| | | | |
|---|---|---|---|
| 3,106,021 | 10/1963 | Borden | 32—28 |
| 3,313,025 | 4/1967 | Hertz | 32—23 |
| 3,346,957 | 10/1967 | Maurer et al. | 32—22 |

ROBERT M. WALKER, Primary Examiner

U.S. Cl. X.R.

32—28; 60—102

UNITED STATES PATENT OFFICE
CERTIFICATE OF CORRECTION

Patent No. 3,556,669     Dated January 19, 1971

Inventor(s) John J. Valeska, Donald N. Spencer, Edson L. Kumme

It is certified that error appears in the above-identified patent and that said Letters Patent are hereby corrected as shown below:

Claim 1
    line 3, after the word under "pretssure" should read --pressure--.

Claim 3
    line 1, change the word "con-off" to --on-off--.

Claim 4
    at the end of line 16 and the beginning of line 17, delete "having a different tool".

Signed and sealed this 25th day of May 1971.

(SEAL)
Attest:

EDWARD M. FLETCHER, JR.
Attesting Officer

WILLIAM E. SCHUYLER, JR.
Commissioner of Patents